US012654609B2

(12) United States Patent
Tian et al.

(10) Patent No.: US 12,654,609 B2
(45) Date of Patent: Jun. 16, 2026

(54) TRANSPORT VEHICLE AND METHOD OF USING TRANSPORT VEHICLE

(71) Applicant: Yantai Jereh Petroleum Equipment & Technologies Co., Ltd., Yantai (CN)

(72) Inventors: Dekun Tian, Yantai (CN); Libin Zhou, Yantai (CN); Xin Li, Yantai (CN); Tao Kou, Yantai (CN); Xu Liu, Yantai (CN); Qiong Wu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 468 days.

(21) Appl. No.: 18/107,538

(22) Filed: Feb. 9, 2023

(65) Prior Publication Data

US 2024/0059204 A1 Feb. 22, 2024

Related U.S. Application Data

(63) Continuation of application No. PCT/CN2022/132077, filed on Nov. 15, 2022.

(30) Foreign Application Priority Data

Aug. 19, 2022 (CN) .......................... 202210998622.2

(51) Int. Cl.
  *B60P 1/54* (2006.01)
  *B60P 1/04* (2006.01)
  (Continued)

(52) U.S. Cl.
  CPC .............. *B60P 1/5433* (2013.01); *B60P 1/04* (2013.01); *B60P 1/16* (2013.01); *B60P 1/28* (2013.01); *B60P 1/6418* (2013.01)

(58) Field of Classification Search
  CPC ...... B60P 1/04; B60P 1/06; B60P 1/10; B60P 1/12; B60P 1/14; B60P 1/16; B60P 1/18;
  (Continued)

(56) References Cited

U.S. PATENT DOCUMENTS 3,253,716 A * 5/1966 Stratton ................ B60P 1/5433
                                                    414/550
3,301,416 A * 1/1967 Bopp .................... B60P 1/5466
                                                    414/543
(Continued)

FOREIGN PATENT DOCUMENTS

CN       101954880 A       1/2011
CN       103182976 A       7/2013
       (Continued)

OTHER PUBLICATIONS

English machine translation of CN 101954880 A. (Year: 2025).*
(Continued)

*Primary Examiner* — James Keenan
(74) *Attorney, Agent, or Firm* — XSENSUS LLP

(57) ABSTRACT

The present application discloses a transport vehicle and a method of using it, and refers to the field of transport vehicles. A transport vehicle may comprise: a chassis trailer, a lifting device and a hanging device; wherein the chassis trailer may have a carrying area and a hanging area; the lifting device may comprise a lifting drive mechanism and a frame, the lifting drive mechanism may connect the frame to the chassis trailer, the frame may be flippably connected to the chassis trailer, the frame may have a first state and a second state relative to the chassis trailer, the frame in the first state may be laid flat on the carrying area, the frame may be used to carry an equipment body, the frame in the second state may be erected on the chassis trailer and may cause the equipment body to be erected on the hanging area; the hanging device may be provided at the chassis trailer, for (Continued)

hanging the equipment body from the hanging area and transferring it to a predetermined position. A method of using a transport vehicle, applied to the above-mentioned transport vehicle.

8 Claims, 9 Drawing Sheets

(51) Int. Cl.
| | | |
|---|---|---|
| *B60P 1/16* | (2006.01) | |
| *B60P 1/28* | (2006.01) | |
| *B60P 1/64* | (2006.01) | |

(58) Field of Classification Search
CPC ...... B60P 1/20; B60P 1/22; B60P 1/28; B60P 1/54; B60P 1/5404; B60P 1/5423; B60P 1/5428; B60P 1/5433; B60P 1/5438; B60P 1/5457; B60P 1/5461; B60P 1/5466; B60P 1/5471; B60P 1/5476; B60P 1/548; B60P 1/5485; B60P 1/549; B60P 1/5495; B60P 1/6418; Y10S 414/132
USPC ........ 414/489, 501, 546, 551, 555, 589, 919
See application file for complete search history.

(56) References Cited

U.S. PATENT DOCUMENTS

| | | | | | |
|---|---|---|---|---|---|
| 3,473,679 | A | * | 10/1969 | Weichel | B60P 1/5433 414/523 |
| 3,780,891 | A | * | 12/1973 | Steiner | B60P 1/5433 414/695 |
| 4,091,943 | A | * | 5/1978 | Bay-Schmith | B60P 1/5433 414/734 |
| 4,659,276 | A | * | 4/1987 | Billett | B60P 1/5433 414/540 |
| 5,697,758 | A | * | 12/1997 | Tilley | A01D 90/08 414/812 |
| 5,975,832 | A | * | 11/1999 | Winkler | B60P 1/5433 414/24.5 |
| 6,257,670 | B1 | | 7/2001 | Rogers | |
| 8,393,847 | B1 | * | 3/2013 | Mecklenburg | B60P 1/5433 414/539 |
| 9,534,473 | B2 | * | 1/2017 | Morris | F01D 25/30 |
| 10,136,581 | B2 | * | 11/2018 | Millsap | B60P 1/28 |
| 11,143,000 | B2 | * | 10/2021 | Li | H02K 7/1823 |
| 11,607,982 | B2 | * | 3/2023 | Tian | B60P 1/16 |
| 2021/0277613 | A1 | * | 9/2021 | Hendricks, Sr. | B60P 1/5433 |
| 2023/0022230 | A1 | * | 1/2023 | Steininger | B60P 1/5433 |

FOREIGN PATENT DOCUMENTS

| | | | | | | |
|---|---|---|---|---|---|---|
| CN | 104098030 | A | | 10/2014 | | |
| CN | 104139726 | A | | 11/2014 | | |
| CN | 107208557 | A | | 9/2017 | | |
| CN | 110467119 | A | | 11/2019 | | |
| CN | 111301259 | A | | 6/2020 | | |
| CN | 112794255 | A | * | 5/2021 | | B60P 1/6436 |
| EP | 1462307 | A1 | * | 9/2004 | | B60P 1/16 |
| RU | 2767816 | C1 | | 3/2022 | | |
| WO | WO-2022039650 | A1 | * | 2/2022 | | A01G 23/003 |

OTHER PUBLICATIONS

Office Action issued Jan. 23, 2025 in Chinese Patent Application No. 202210998622.2 with machine English translation thereof.
Office Action and Search Report issued May 15, 2025 in Chinese Patent Application No. 202210998622.2 with machine English translation thereof.
Notice of Allowance and Search Report issued Jun. 4, 2025 in Chinese Patent Application No. 202110137704.3 with machine English translation thereof.
Notice of Allowance and Search Report issued Aug. 20, 2025 in Chinese Patent Application No. 202210998622.2 with machine English translation thereof.

\* cited by examiner

TRANSPORT VEHICLE AND METHOD OF USING TRANSPORT VEHICLE

CROSS-REFERENCE TO RELATED APPLICATIONS

The present application is a continuation of International Patent Application No. PCT/CN2022/132077 filed on Nov. 15, 2022, which claims the benefit of priority from the Chinese Patent Application No. 202210998622.2 filed on Aug. 19, 2022, entitled "TRANSPORT VEHICLE AND METHOD OF USING TRANSPORT VEHICLE", the entire content of each is incorporated herein by reference.

TECHNICAL FIELD

The present application belongs to the field of transport vehicle technology, and specifically relates to a transport vehicle and a method of using the transport vehicle.

BACKGROUND

At present, the exhaust of vehicle-mounted gas turbine generator sets are mostly designed for top exhaust, and the exhaust silencer needs to be transported to the site using a transport vehicle and lifted to the installation position using a crane by connecting ropes, or lifted from the installation position to other positions, to facilitate the installation and fixing or disassembly of the exhaust silencer. The above approach requires the cooperation of several people and requires the preparation of the crane in advance, so that the crane and the transport vehicle cooperate to realize the lifting of the exhaust silencer. However, in the process of lifting the exhaust silencer, personnel are required to climb to the installation position to conduct the work at height, which will bring inconvenience to the installation or disassembly of the exhaust silencer and reduce the efficiency of installation or disassembly on the one hand, and bring safety risks to personnel on the other.

SUMMARY

The purpose of some embodiments of this application is to provide a transport vehicle and a method of using the transport vehicle, which can solve problems that the current manner for lifting the exhaust silencer is not conducive to installation or disassembly, causes safety risks and the like.

In order to solve the above technical problems, the present application is implemented as follows.

Embodiments of the present application provide a transport vehicle, comprising: a chassis trailer, a lifting device and a hanging device; the chassis trailer has a carrying area and a hanging area; the lifting device comprises a lifting drive mechanism and a frame, the lifting drive mechanism connects the frame to the chassis trailer, the frame is flippably connected to the chassis trailer, the frame has a first state and a second state relative to the chassis trailer, the frame in the first state is laid flat on the carrying area, the frame is used to carry an equipment body, the frame in the second state is erected on the chassis trailer and causes the equipment body to be erected on the hanging area; the hanging device is provided at the chassis trailer, for hanging the equipment body from the hanging area and transferring it to a predetermined position.

Embodiments of the present application further provide a method of using a transport vehicle, applied to the above transport vehicle, the method of using the transport vehicle comprises: transporting an equipment body, carried in a carrying area, around a predetermined position by a chassis trailer; lifting the equipment body by a lifting device, to move the equipment body from the carrying area of the chassis trailer to a hanging area; gripping and hanging the equipment body by a hanging device, to transfer the equipment body from the hanging area to the predetermined position.

REFERENCE SIGNS

Figure 1:
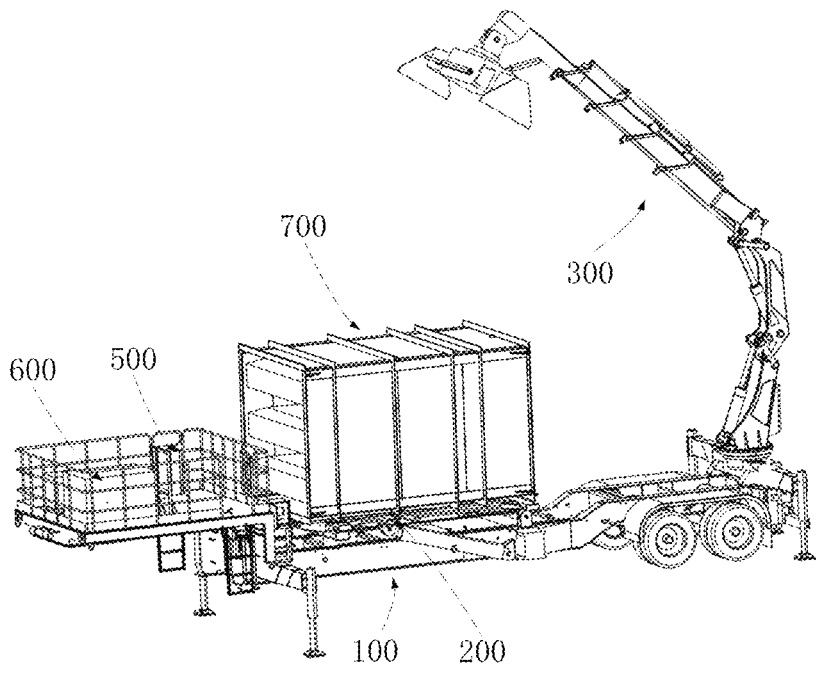
FIG. 1 is a schematic diagram of, in a transport vehicle disclosed in an embodiment of this application, a hanging device at a high position.

100—chassis trailer; 110—trailer body; 111—carrying area; 1111—first carrying surface; 112—hanging area; 1121—second carrying surface; 1131—inclined surface; 120—support leg; 130—enclosure;

200—lifting device; 210—lifting drive mechanism; 211—first lifting cylinder; 212—second lifting cylinder; 220—frame;

300—hanging device; 310—mechanical arm; 320—gripper;

410—first camera element; 420—first laser emitting element; 430—ranging element; 440—second camera element; 450—second laser emitting element; 460—pressure detecting element; 470—inclination detecting element;

500—control device;

600—hydraulic system;

700—equipment body;

800—power vehicle.

DETAILED DESCRIPTION

Technical solutions in the embodiments of this application will be clearly and completely described below in conjunction with the drawings of the embodiments of this application, and it is clear that the described embodiments are a part of the embodiments of this application, and not all of them. Based on the embodiments of this application, all other embodiments obtained by a person of ordinary skill in the art without creative labor fall within the protection scope of this application.

The terms "first", "second" etc. in the description and claims of this application are used to distinguish similar objects and are not intended to describe a particular order or sequence. It should be understood that the data so used is interchangeable, where appropriate, so that embodiments of the present application can be implemented in an order other than those illustrated or described herein, and that the objects distinguished by "first", "second", etc. are generally of one type and the number of the objects is not limited. For example, the first object may be one or more. In addition, in the description and the claims, "and/or" indicate at least one of the connected objects, and the character "I" generally indicates an "or" relationship between the associated objects.

The following is a detailed description of the embodiments of this application by means of specific embodiments and their application scenarios in conjunction with the drawings.

Referring to FIGS. 1 through 16, embodiments of the present application discloses a transport vehicle for transporting an equipment body 700, wherein the equipment body 700 may be an overhead exhaust silencer for a gas turbine turbine power generation project, and, of course, other equipment, which is not specifically limited by embodiments of the present application. The disclosed transport vehicle comprises a chassis trailer 100, a lifting device 200 and a hanging device 300.

The chassis trailer 100 is a basic component of the transport vehicle, which can provide an installation base for the lifting device 200, hanging device 300, etc. In addition, the chassis trailer 100 can also be used to carry the equipment body 700 to achieve the transport of the equipment body 700. In some embodiments, the chassis trailer 100 can have a carrying area 111 and a hanging area 112, wherein the carrying area 111 is used to carry the equipment body 700 during transportation to ensure the stability and solidity of the equipment body 700; when the transport vehicle transports the equipment body 700 to the destination, the equipment body 700 can be lifted and flipped by the lifting device 200, so that the equipment body 700 is transferred to the hanging area 112, so that the equipment body 700 can be hanged and transferred by the hanging device 300. In a more specific embodiment, the carrying area 111 is provided adjacent to the hanging area 112 to facilitate the movement of the equipment body 700 from the carrying area 111 to the hanging area 112.

The lifting device 200 is used to lift and flip the equipment body 700 to change the position and form of the equipment body 700 so as to facilitate the equipment body 700 being transferred to a specified position. In some embodiments, the lifting device 200 can comprise a lifting drive mechanism 210 and a frame 220, wherein the lifting drive mechanism 210 is used to provide the driving force for lifting and flipping, and the frame 220 is used to carry the equipment body 700. Specifically, the lifting drive mechanism 210 connects the frame 220 to the chassis trailer 100, and the frame 220 is flippably connected to the chassis trailer 100. Under the driving action of the lifting drive mechanism 210, the frame 220 can be flipped relative to the chassis trailer 100, so that the equipment body 700 can be driven to move by the frame 220 to achieve lifting and flipping.

Optionally, one end of the frame 220 can be mounted to the chassis trailer 100 via an rotating shaft, such that the frame 220 can rotate around the rotating shaft under the driving action of the lifting drive mechanism 210 to lift and flip the equipment body 700. Besides, the lifting drive mechanism 210 can be a linear drive mechanism.

Since the frame 220 is flippable relative to the chassis trailer 100, so that the frame 220 can have a first state and a second state relative to the chassis trailer 100, wherein the first state is a carrying state and the second state is a flipping state. In this way, in the first state, the frame 220 is laid flat in the carrying area 111, at this time, the frame 220 acts as a carrier for the equipment body 700, so as to ensure the stability of carrying the equipment body 700 during the transportation. In the second state, the frame 220 is erected on the chassis trailer 100, and the equipment body 700 is erected on the hanging area 112.

The specific process from the above first state to the second state is as follows. In an initial state (i.e., before the equipment body 700 is transported to the destination), the frame 220 is laid flat in the carrying area 111 (e.g., it can be in a horizontal state) and the upper part of the frame 220 carries the equipment body 700. When the destination is reached, the state of the equipment body 700 first needs to be changed in order to facilitate the hanging, at this time, the lifting drive mechanism 210 is activated, under the driving action of the lifting drive mechanism 210, the frame 220 is flipped from a flat state to an erected state (such as a vertical state). In this process, the equipment body 700 is flipped together with the frame 220, so that it can be gradually lifted from the carrying area 111, and finally the equipment body 700 after being flipped is erected in the hanging area 112, so that it is convenient for the subsequent hanging of the equipment body 700 by the hanging device 300, so as to improve the efficiency of transferring the equipment body 700.

The hanging device 300 is provided at the chassis trailer 100 for hanging the equipment body 700 from the hanging area 112 and transferring it to a predetermined position. Exemplarily, the hanging device 300 can be connected to one end of the chassis trailer 100, specifically the front end or rear end of the chassis trailer 100, etc., so as to provide a sufficiently large space for carrying the equipment body 700.

In the embodiments of this application, the lifting device 200, the hanging device 300 and the chassis trailer 100 are effectively combined to achieve the effect of integration, so that the lifting of the equipment body 700 can be realized by the hanging device 300 provided in the chassis trailer 100 without separately providing a crane. In addition, the equipment body 700 can be flipped and moved by the lifting device 200 to facilitate the hanging of the equipment body 700 by the hanging device 300. By means of the hanging device 300, the equipment body 700 can be hanged and transferred to a predetermined position. And in this process, there is no need to use a sling, and there is no need for personnel to work at height to install or remove the sling, and there is no need for personnel to direct the work at height, thus reducing the difficulty of operation, improving the convenience of operation, and avoiding personnel safety risks.

In order to make the movement of the hanging device 300 more flexible, the hanging device 300 in the embodiments of this application can be a knuckle boom crane, by means of which, the hanging process can be more flexible, in order to improve the adaptability.

Figure 2:
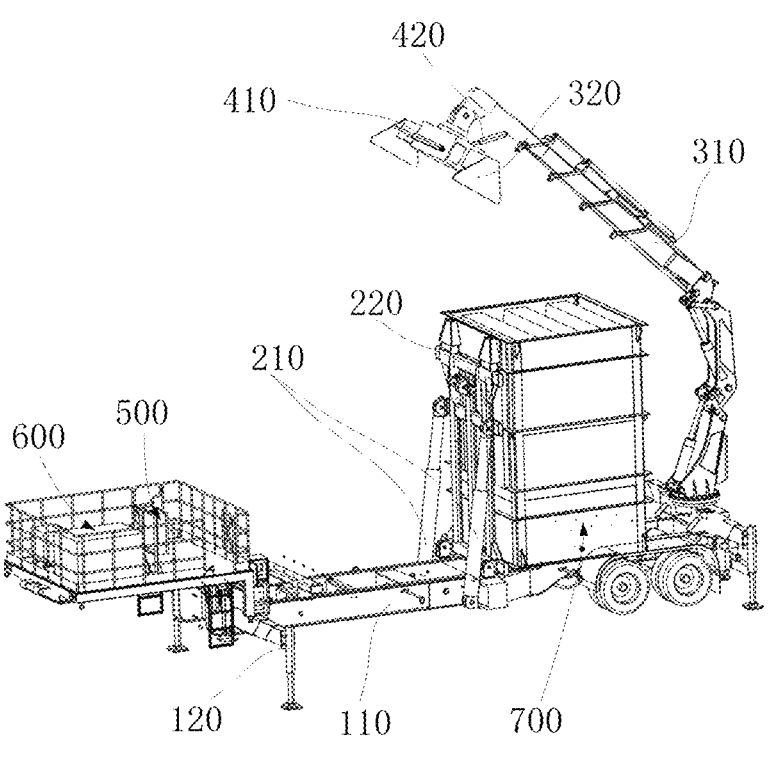
FIG. 2 is a schematic diagram of, on a transport vehicle disclosed in an embodiment of this application, an equipment body under an erected state.

Referring to FIG. 2, in some embodiments, the hanging device 300 can comprises a mechanical arm 310 and a gripper 320, wherein one end of the mechanical arm 310 is rotatably connected to the chassis trailer 100, and the gripper 320 is connected to the other end of the mechanical arm 310, for gripping or releasing the equipment body 700. Exemplarily, the mechanical arm 310 can be a multi-axis mechanical arm 310, which can comprise a plurality of small arms that two adjacent small arms can rotate relative to each other and the rotation axes can be parallel or non-parallel, whereby different forms of oscillation may be achieved, thereby allowing the range that the hanging device 300 can reach to be extended.

A hydraulic jaw can be employed as the gripper 320, the gripper 320 is driven for gripping action or release action in a hydraulic manner. Thus, it can, when gripping the equipment body 700, ensure that the equipment body 700 is not easy to fall off, and when releasing the equipment body 700, achieve rapid release.

Based on the above settings, it is possible to eliminate the need to provide ropes on the equipment body 700, and it is also possible to eliminate the need for personnel to install or disassemble the ropes, which can reduce personnel labor intensity and safety risks, and can improve the efficiency of hanging or release of the equipment body 700 in order to improve the efficiency of installation or disassembly of the equipment body 700.

Figure 15:
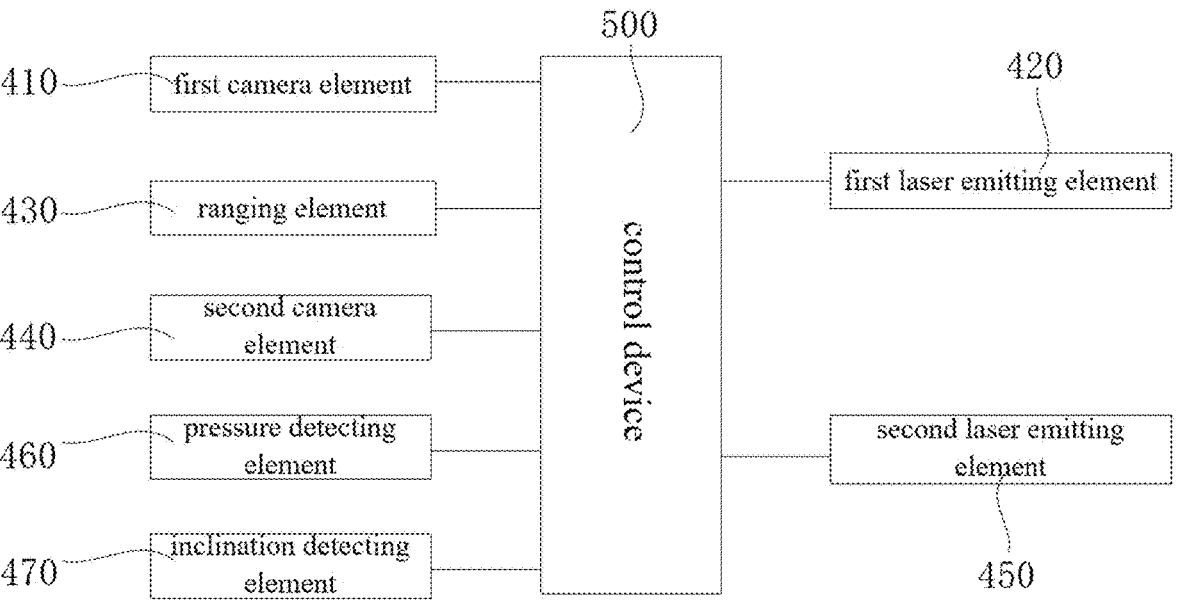
FIG. 15 is a schematic diagram of the connection of electrical components disclosed in an embodiment of this application.
Figure 16:
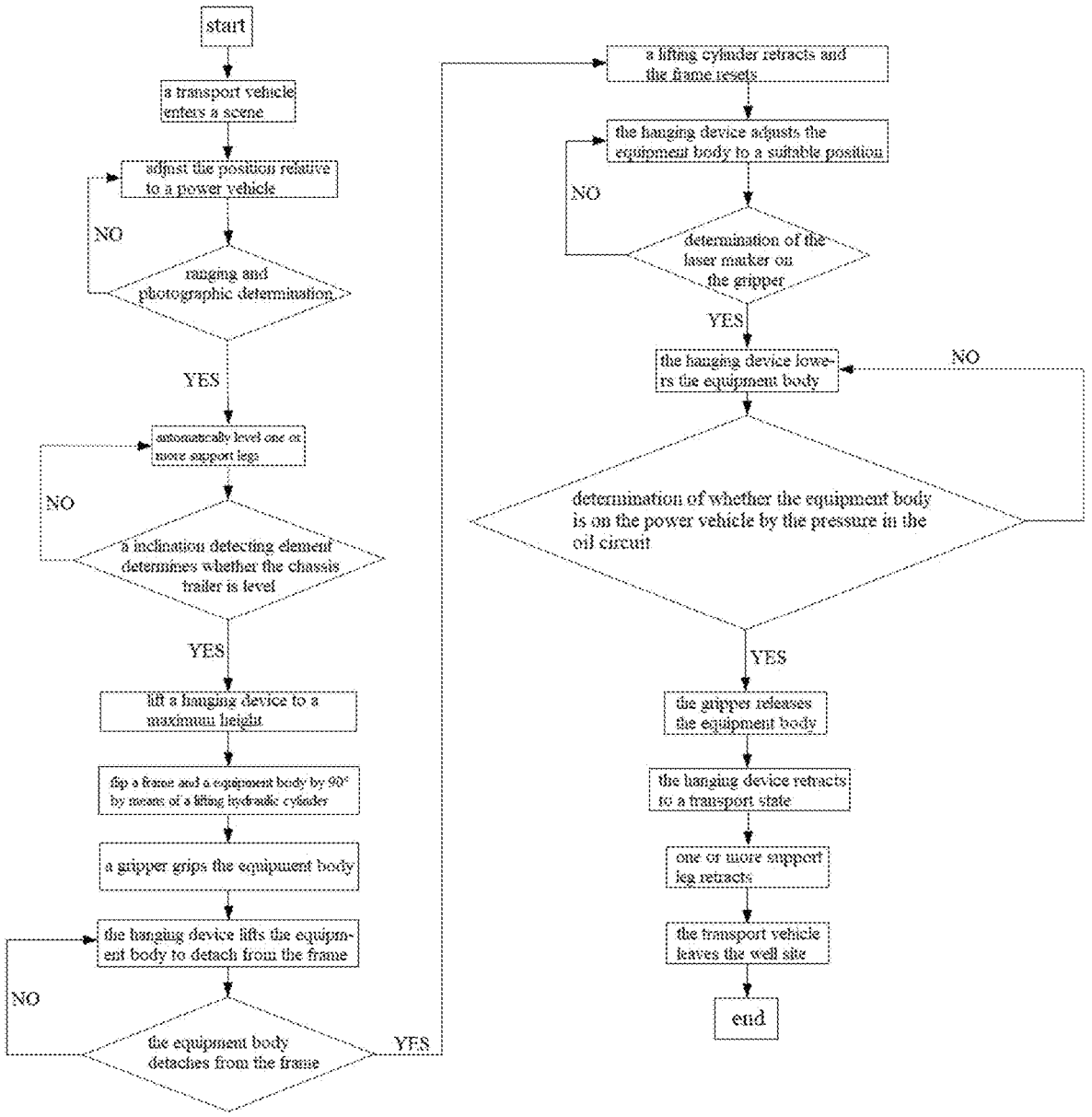
FIG. 16 is a flow chart of the process of using a transport vehicle disclosed in an embodiment of this application.

Referring to FIG. 2 and FIG. 15, in order to improve the position accuracy of placing the equipment body 700, the transport vehicle in the embodiments of this application can also comprise a first camera element 410 and a first laser emitting element 420, wherein the first laser emitting element 420 is used to emit a laser marker, the first camera element 410 is used to photograph the laser marker, the first camera element 410 and the first laser emitting element 420 are both provided at the gripper 320, and the first camera element 410 and the first laser emitting element 420 are both electrically connected to the control device 500 of the transport vehicle.

Specifically, in the process of the equipment body 700 being transferred to the predetermined position, the equipment body 700 is first transferred to the top near the predetermined position by the hanging device 300, and then the control device 500 controls the hanging device 300 to stop moving and controls the first laser emitting element 420 to emit a laser marker to the predetermined position, and the first camera element 410 observes and photographs whether the laser marker is located in a target area of the predetermined position, so as to determine whether the equipment body 700 is placed in the predetermined position. When the laser marker is within the target area, it indicates that the position of the equipment body 700 is comparatively accurate, and the position accuracy can be ensured by placing it directly downward; when the laser marker is beyond the target area, it indicates that the position of the equipment body 700 has deviation, and the control device 500 controls the hanging device 300 to make adaptive adjustment to make the laser marker located within the target area.

Optionally, the first laser emitting element 420 can emit a cross laser marker, and accordingly, the target area of the predetermined position can be a cross target area, such that the positioning can be conducted in two mutually perpendicular directions in a horizontal plane, so that the positioning accuracy can be improved to ensure the position accuracy of the equipment body 700. In addition, the first camera element 410 can be a camera and the like.

In some embodiments, both the mechanical arm 310 and the gripper 320 can be hydraulically driven to improve the hanging capacity of the mechanical arm 310 and the gripping capacity of the gripper 320, and to improve the hanging capacity of the entire hanging device 300 to a certain extent. Based on this, the transport vehicle can comprise a hydraulic system 600, and the hydraulic system 600 can comprise an oil circuit, and the oil circuit is connected to the mechanical arm 310 and the gripper 320 respectively, in order to transmit hydraulic oil to the mechanical arm 310 and the gripper 320 through the oil circuit, and to realize reflux of the hydraulic oil, so that the mechanical arm 310 and the gripper 320 can be powered. In addition, the hydraulic system 600 can further comprise a hydraulic power unit (e.g., a hydraulic pump, etc.), a hydraulic control component (e.g., various control valves, etc.).

In order to determine whether the gripper 320 has fully released the equipment body 700, in some embodiments, the oil circuit connected to the mechanical arm 310 and/or the oil circuit connected to the gripper 320 is provided with a pressure detecting element 460, which is electrically connected to the control device 500 of the transport vehicle. Based on this, the oil pressure in the oil circuit can be detected by the pressure detecting element 460, and when the equipment body 700 is not released, both the mechanical arm 310 and the gripper 320 have a load, and at this time the oil pressure in the oil circuit connected to the mechanical arm 310 and in the oil circuit connected to the gripper 320 are both relatively high; on the contrary, when the equipment body 700 is released, both the mechanical arm 310 and the gripper 320 can be interpreted as not having a load (gravity is negligible), and at this time the oil pressure in the oil circuit connected to the mechanical arm 310 and in the oil circuit connected to the gripper 320 are both relatively low. Based on the above, the oil pressure of at least one of the oil circuit connected to the mechanical arm 310 and the oil circuit connected to the gripper 320 can be detected by the pressure detecting element 460, and the detected oil pressure result is sent to the control device 500, and the detected oil pressure data is compared with preset oil pressure data by the control device 500, so as to determine whether the equipment body 700 is released.

By determining whether the equipment body 700 is released, it can effectively avoid the influence of the equipment body 700 when the hanging device 300 resets, so that on the one hand, it can ensure a normal resetting of the hanging device 300 to prepare for the next hanging, and on the other hand, it can also prevent the hanging device 300 from bringing the equipment body 700 down and causing damage to the equipment body 700.

Optionally, the pressure detection element 460 can be a pressure sensor, but of course, it can also be of other types, the embodiments of this application do not make a specific limitation on this.

Figure 3:
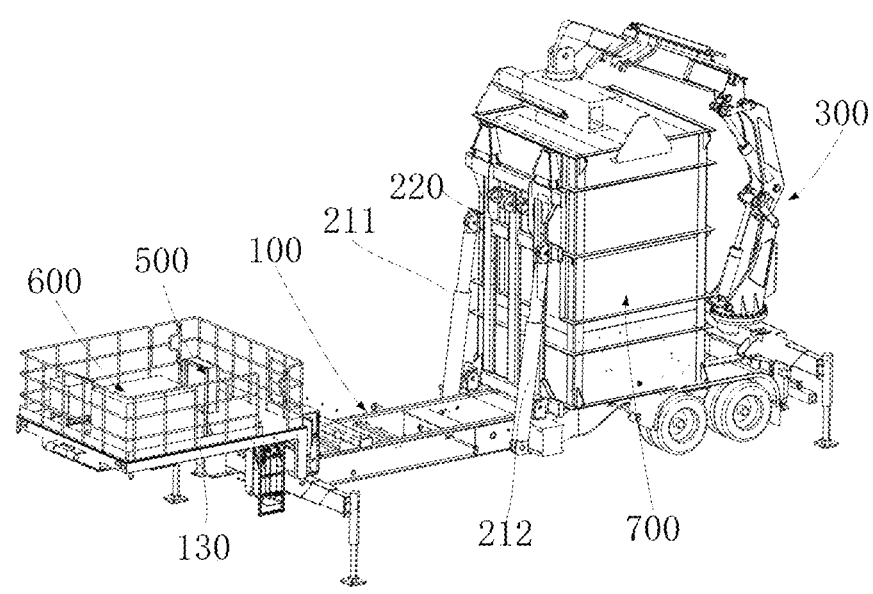
FIG. 3 is a schematic diagram of, in a transport vehicle disclosed in an embodiment of this application, a gripper of a hanging device gripping an equipment body.
Figure 4:
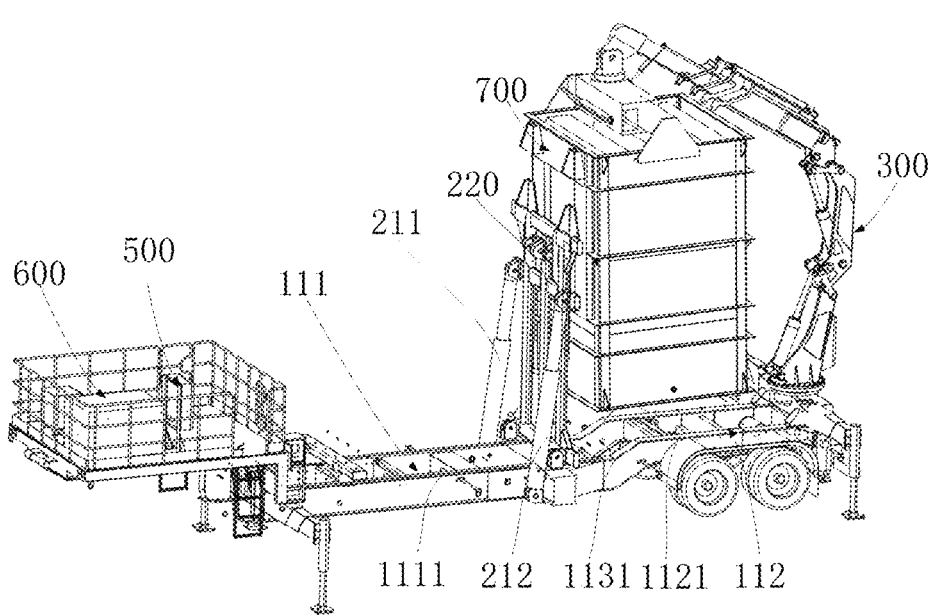
FIG. 4 is a schematic diagram of, on a transport vehicle disclosed in an embodiment of this application, an equipment body being detached from a frame.

Referring to FIGS. 3 and 4, in order to improve the stability of the lifting process, the lifting drive mechanism 210 can comprise a first lifting cylinder 211 and a second lifting cylinder 212, wherein one end of the first lifting cylinder 211 is movably connected to one side of the chassis trailer 100 along a left-right direction, and the other end of the first lifting cylinder 211 is movably connected to the frame 220; similarly, one end of the second lifting cylinder 212 is movably connected to the other side of the chassis trailer 100 along the left-right direction, and the other end of the second lift cylinder 212 is movably connected to the frame 220, wherein the left-right direction is perpendicular to the heading direction of the transport vehicle. Exemplarily, one end of the first lifting cylinder 211 can be rotatably connected to one side of the chassis trailer 100 by a rotating shaft and the other end can be connected to the frame 220 by a rotating shaft, and one end of the second lifting cylinder 212 can be connected to the other side of the chassis trailer 100 by a rotating shaft and the other end can be connected to the frame 220 by a rotating shaft.

Based on the above settings, the first lifting cylinder 211 and the second lifting cylinder 212 can respectively apply driving force to the frame 220 from the left and right sides, so that the left and right sides of the frame 220 are subjected to a comparatively balanced force, which can effectively prevent the deformation of the frame 220 due to uneven force on both sides, thus ensuring the stability of the frame 220, further improving the lifting stability of the equipment body 700, and effectively preventing the equipment body 700 from tipping and damage during the lifting process.

In addition, both the first lifting cylinder 211 and the second lifting cylinder 212 are connected to the frame 220 far from the rotating connection between the frame 220 and the chassis trailer 100, so that the driving torque can be increased with the same driving force, i.e., the first lifting cylinder 211 and the second lifting cylinder 212 of smaller size can be used to achieve the same driving torque, thus reducing cost.

Referring to FIG. 15, in some embodiments, the transport vehicle can further comprise a ranging element 430, which is provided on the side of the chassis trailer 100, and the ranging element 430 is electrically connected to the control device 500 of the transport vehicle for detecting the distance between the chassis trailer 100 and a predetermined position in the left-right direction. For example, the left and/or right side of the chassis trailer 100 can be provided with a plurality of ranging elements 430, and the plurality of ranging elements 430 are spaced along a front-rear direction of the chassis trailer 100, so that the distance between the chassis trailer 100 and the predetermined position in the left-right direction can be detected by the plurality of ranging elements 430, respectively, wherein the front-rear direction is parallel to the heading direction of the transport vehicle.

In some cases, the equipment body 700 can be placed on the top surface of the power vehicle 800, and a certain area on the top surface of the power vehicle 800 is the predetermined position, at which time, before transferring the equipment body 700 to the predetermined position, the chassis trailer 100 can first be placed parallel to the power vehicle 800, i.e., the front-rear direction of the chassis trailer 100 is parallel to the front-rear direction of the power vehicle 800, at which time, the plurality of ranging elements 430 can range a plurality of areas between the chassis trailer 100 and the power generator 800 to facilitate adjusting the distance between the chassis trailer 100 and the power vehicle 800 so that the distance between the chassis trailer 100 and the power vehicle 800 is within a preset range embedded within the control device 500, e.g., within a range of 2.3 meters to 3 meters, etc.

Based on the above settings, the distance between the plurality of areas between the chassis trailer 100 and the power vehicle 800 can be detected by the plurality of ranging elements 430, and the distance information is sent to the control device 500, and the distance information detected by the plurality of ranging elements can be compared with the preset range by the control device 500 to determine whether it is within the preset range, and when the detected multiple distance information is within the preset range, it indicates that the relative position between the chassis trailer 100 and the power vehicle 800 meets the requirements, so that the next operation can be carried out to lift the equipment body 700 to the top of the power vehicle 800; when at least a part of the detected distance information is not within the preset range, it indicates that the relative position between the chassis trailer 100 and the power vehicle 800 does not meet the requirements, and at this time the position of the chassis trailer 100 can be controlled and adjusted until the hanging requirements are met.

Optionally, the ranging element 430 can be a laser rangefinder to improve ranging accuracy.

Continuing to refer to FIG. 15, in order to determine the position accuracy of the transport vehicle in the front-rear direction, the transport vehicle can further comprise a second camera element 440 and a second laser emitting element 450, wherein the second camera element 440 and the second laser emitting element 450 are both provided on the side of the chassis trailer 100, the second camera element 440 is used to emit a laser marker, the second camera element 440 is used to photograph the laser marker, the second laser emitting element 450 and the second camera element 440 are both electrically connected to the control device 500 of the transport vehicle, and the control device 500 can determine the distance between the chassis trailer 100 and the predetermined position in the front-rear direction based on the laser marker photographed by the second camera element 440.

Specifically, in the process of the transport vehicle approaching the predetermined position, the second camera element 440 is controlled to emit a laser marker to the predetermined position, the second camera element 440 observes and photographs the laser marker to determine whether the laser marker is located in a target area of the predetermined position, so as to determine whether the position of the transport vehicle arrives a designated position. When the laser marker is within the target area, it indicates that the position of the transport vehicle is comparatively accurate, and the hanging operation can be carried out; when the laser marker is beyond the target area, it indicates that the position of the transport vehicle has deviation, and the control device 500 controls the chassis trailer 100 to make adaptive adjustment to make the laser marker located within the target area.

Optionally, the second laser emitting element 450 can emit a cross laser marker, and accordingly, the target area of the predetermined position can be a cross target area, such that the positioning can be conducted in two mutually perpendicular directions in a horizontal plane, so that the positioning accuracy can be improved to ensure the position accuracy of the equipment body 700. In addition, the second camera element 440 can be a camera and the like.

Based on the above settings, the distance between the transport vehicle with the equipment body 700 carried by it and the predetermined position in the front-rear direction can be adjusted, thus enabling the adjustment of the front-rear distance.

In some cases, the equipment body 700 can be placed on the top surface of the power vehicle 800, and a certain area on the top surface of the power vehicle 800 is the predetermined position, at which time, before transferring the equipment body 700 to the predetermined position, the distance between the chassis trailer 100 and the power vehicle 800 in the front-rear direction can be adjusted, at which time, the second laser emitting element 450 and the second camera element 440 cooperating with each other can realize the acquisition of the position of the chassis trailer 100 so as to adjust the distance between the chassis trailer 100 and the power vehicle 800 in the front-rear direction, so that the distance between the chassis trailer 100 and the power vehicle 800 in the front-rear direction is within the preset range embedded in the control device 500.

Referring to FIG. 2, in order to improve the stability of the entire transport vehicle during lifting and hanging, the chassis trailer 100 can further comprise a trailer body 110 and a plurality of telescopic support legs 120, and the plurality of support legs 120 are provided at the edges of the trailer body 110 respectively. In some embodiments, the telescopic action of the plurality of support legs 120 can be hydraulically driven to improve the support force of the support legs 120, which can improve the stability of the chassis trailer 100 to a certain extent. Based on this, the transport vehicle can further comprise a hydraulic system 600, and the hydraulic system 600 can comprise an oil circuit, and the plurality of support legs 120 are all connected to the oil circuit of the hydraulic system 600 of the transport vehicle, in order to transmit hydraulic oil to the respective support legs 120 through the oil circuit, and to realize reflux of the hydraulic oil, so that the respective support legs 120 can be powered.

In order to further enhance the stability of the whole transport vehicle during lifting and hanging, the transport vehicle can further comprise a leveling device, wherein the leveling device can comprise a inclination detecting element 470 provided in the trailer body 110, and both the inclination detecting element 470 and the hydraulic system 600 are connected to the control device 500 of the transport vehicle, and the control device 500 is used to control at least part of the support legs 120 to extend or retract accordingly by the hydraulic system 600 to level the trailer body 110 according to the inclination information of the trailer body 110 detected by the inclination detecting element 470.

Specifically, before hanging the equipment body 700, the plurality of support legs 120 are extended respectively to support the trailer body 110, and meanwhile the inclination detecting element 470 detects the inclination of the trailer body 110. When the detected inclination is within a preset inclination range embedded in the control device 500, it is determined that the trailer body 110 meets the hanging requirements and does not need to be leveled; when the detected inclination is at least partially within the preset inclination range embedded in the control device 500, it is determined that the trailer body 110 is inclined too much and needs to be leveled. At this time, the control device 500 controls one or more corresponding support legs 120 to extend and retract through the hydraulic system 600, so as to partially lift the trailer body 110 accordingly, so as to realize the leveling process of the trailer body 110, and thus to meet the hanging requirements, to ensure that the transport vehicle will not tilt and roll over during the hanging process, and can ensure the stability of the transport vehicle.

Optionally, the inclination detecting element 470 can be an inclinometer.

Considering that in some cases the height dimension of the equipment body 700 is too large to meet the actual requirements and affects the arrangement space of the lifting device 200, it is possible to make a part of the chassis trailer 100 a sunken area to increase the lifting space of the equipment body 700 through the sunken area.

Referring to FIG. 4, in some embodiments, the carrying area 111 has a first carrying surface 1111, the hanging area 112 has a second carrying surface 1121, the horizontal position of the first carrying surface 1111 is lower than the horizontal position of the second carrying surface 1121, and the first carrying surface 1111 is connected with the second carrying surface 1121 by an inclined surface 1131. Based on this, the carrying area 111 is the sunken area, and before the lifting device 200 is lifted, the frame 220 is located within the carrying area 111, and the equipment body 700 is located above the frame 220, and because the carrying area 111 is lower, it makes the equipment body 700 also relatively lower, and accordingly, the hanging area 112 is higher, so that the equipment body 700 located in the low position can be lifted and flipped to the hanging area 112 at the high position, so that the lifting space can be increased to facilitate the equipment body 700 to be lifted and flipped on the chassis trailer 100, thus facilitating the movement of the equipment body 700 to the hanging area 112 from the carrying area 111, and the space for the arrangement of the lifting cylinder in the lifting device 200 can be increased.

Optionally, the carrying area 111 of the chassis trailer 100 can be of a box-beam structure to increase the strength of the chassis trailer 100.

Referring to FIG. 3, in some embodiments, the transport vehicle can further comprise an enclosure 130 that is provided on the chassis trailer 100, and the enclosure 130 encloses a holding space on the chassis trailer 100. Exemplarily, the control device 500, the hydraulic system 600, and other components can be provided within the holding space. The enclosure 130 can provide protection for the components contained in the holding space to prevent external factors from interfering with or damaging the components in the holding space.

In a more specific embodiment, the enclosure 130 can be provided at the end of the chassis trailer 100 that backs away from the hanging device 300, and, of course, can be provided at other locations on the chassis trailer 100.

The transport vehicle in the embodiments of this application can further be remotely controlled by a remote control system, for example, by operating a wireless remote controller to achieve remote control of the transport vehicle, which can improve the convenience of control and reduce personnel labor intensity.

Based on the above transport vehicle, the embodiments of the this application further disclose a method of using a transport vehicle, applied to the above transport vehicle, with reference to FIGS. 1 to 16, the method of using a transport vehicle can comprise:

transporting an equipment body 700, carried in a carrying area 111, around a predetermined position by a chassis trailer 100;

lifting the equipment body 700 by a lifting device 200, to move the equipment body 700 from the carrying area 111 of the chassis trailer 100 to a hanging area 112;

gripping and hanging the equipment body 700 by a hanging device 300, to transfer the equipment body 700 from the hanging area 112 to the predetermined position.

It should be noted here that the specific implementation process of the method of using a transport vehicle can be referred to the corresponding content regarding the above transport vehicle and will not be repeated here.

Figure 5:
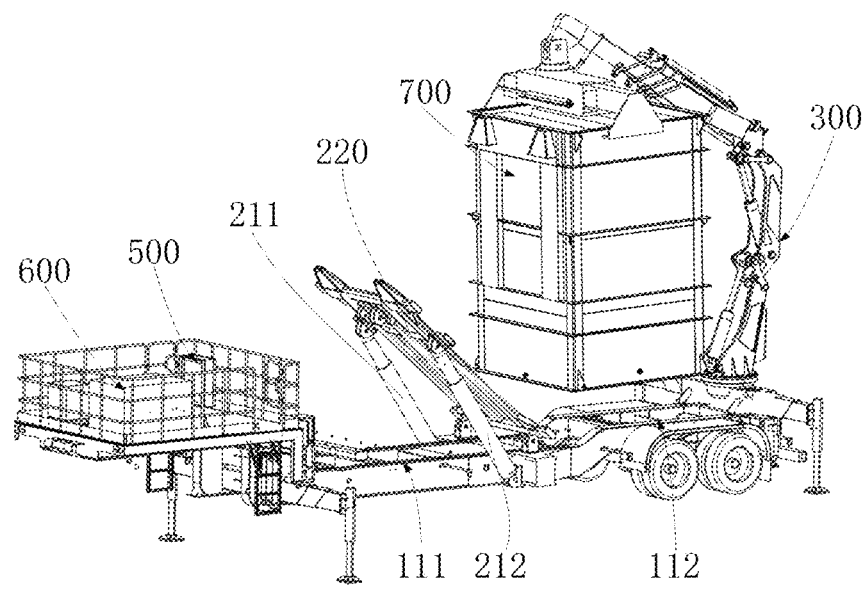
FIG. 5 is a schematic diagram of, in a transport vehicle disclosed in an embodiment of this application, an retraction process of a frame.
Figure 6:
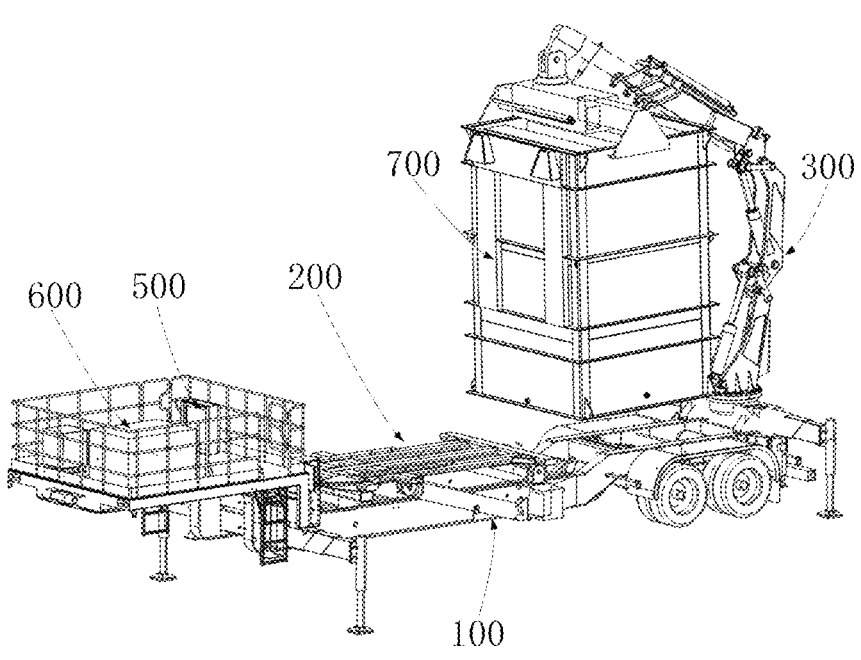
FIG. 6 is a schematic diagram of, in a transport vehicle disclosed in an embodiment of this application, a frame retracted to a flat state.
Figure 7:
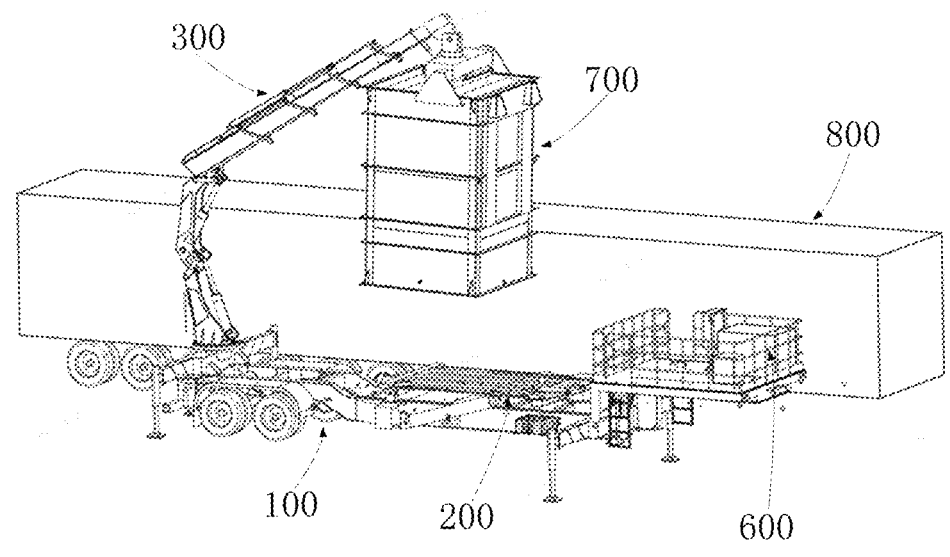
FIG. 7 is a schematic diagram of a transport vehicle disclosed in an embodiment of this application hanging an equipment body and transferring it to a power vehicle.
Figure 8:
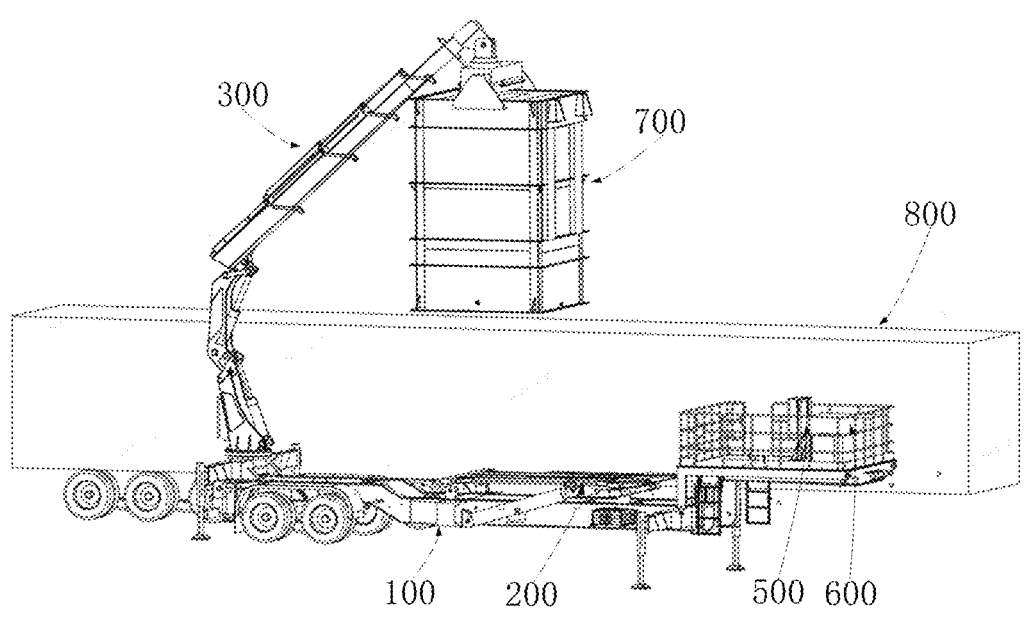
FIG. 8 is a schematic diagram of a transport vehicle disclosed in an embodiment of this application hanging an equipment body and adjusting in height.
Figure 9:
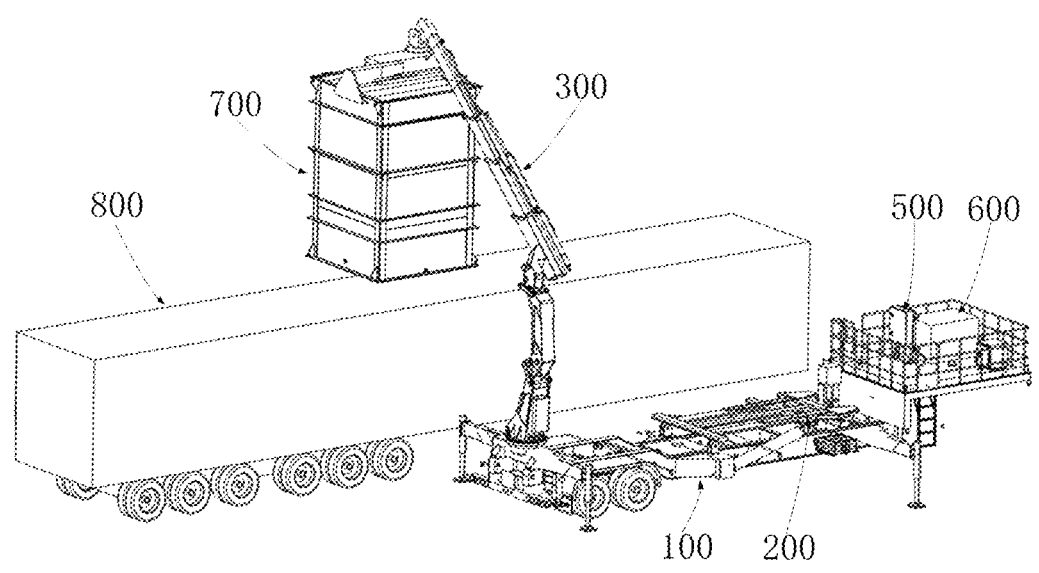
FIG. 9 is a schematic diagram of a transport vehicle disclosed in an embodiment of this application hanging an equipment body to the top of a power vehicle.
Figure 10:
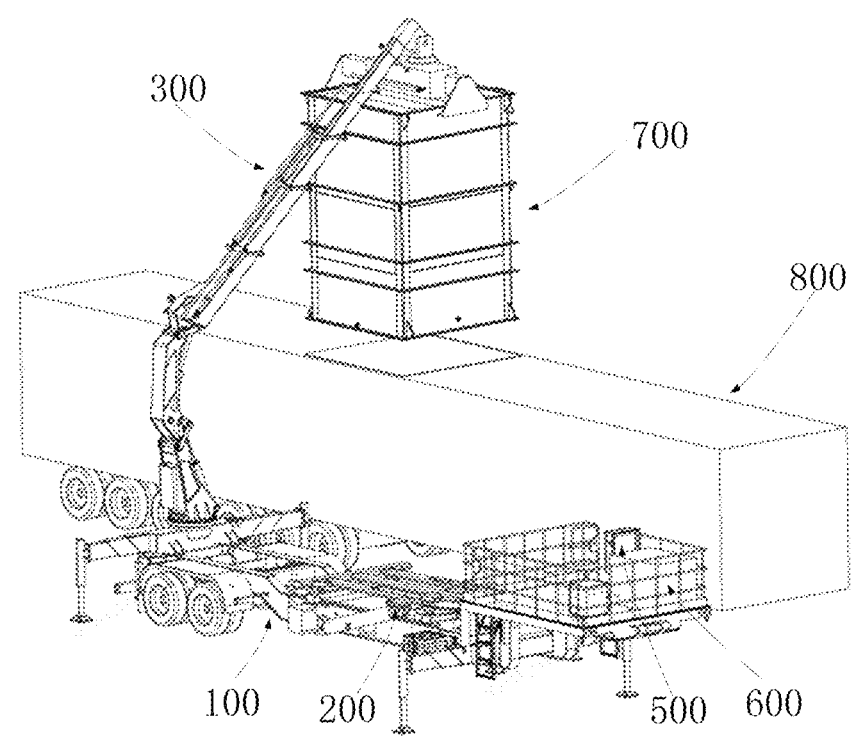
FIG. 10 is a schematic diagram of a transport vehicle disclosed in an embodiment of this application hanging an equipment body and adjusting in horizontal position.
Figure 11:
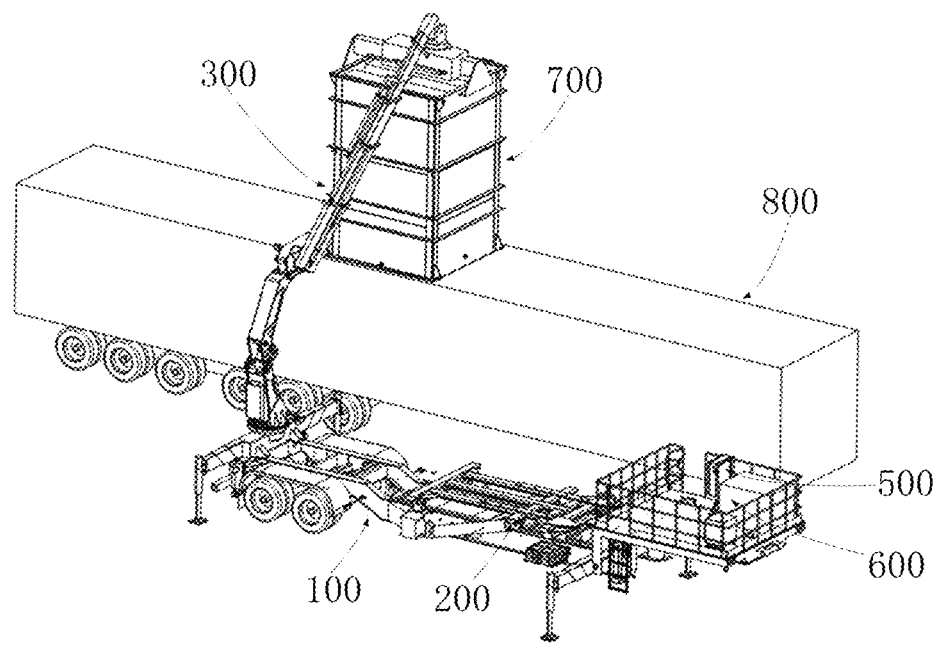
FIG. 11 is a schematic diagram of a transport vehicle disclosed in an embodiment of this application hanging an equipment body and placing it on the top of a power vehicle.
Figure 12:
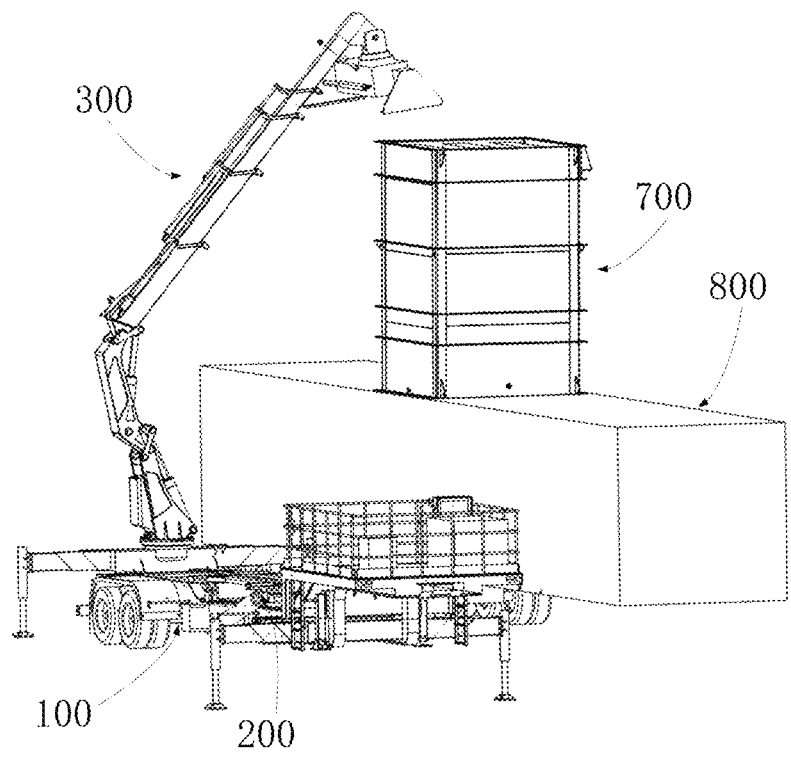
FIG. 12 is a schematic diagram of, in a transport vehicle disclosed in an embodiment of this application, a gripper releasing an equipment body.
Figure 13:
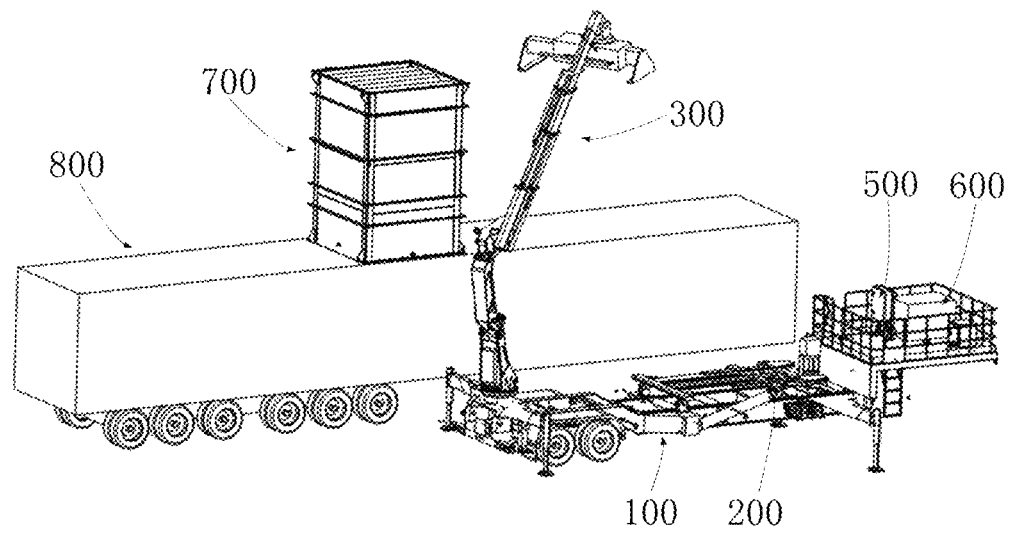
FIG. 13 is a schematic diagram of, in a transport vehicle disclosed in an embodiment of this application, an retraction process of a hanging device.
Figure 14:
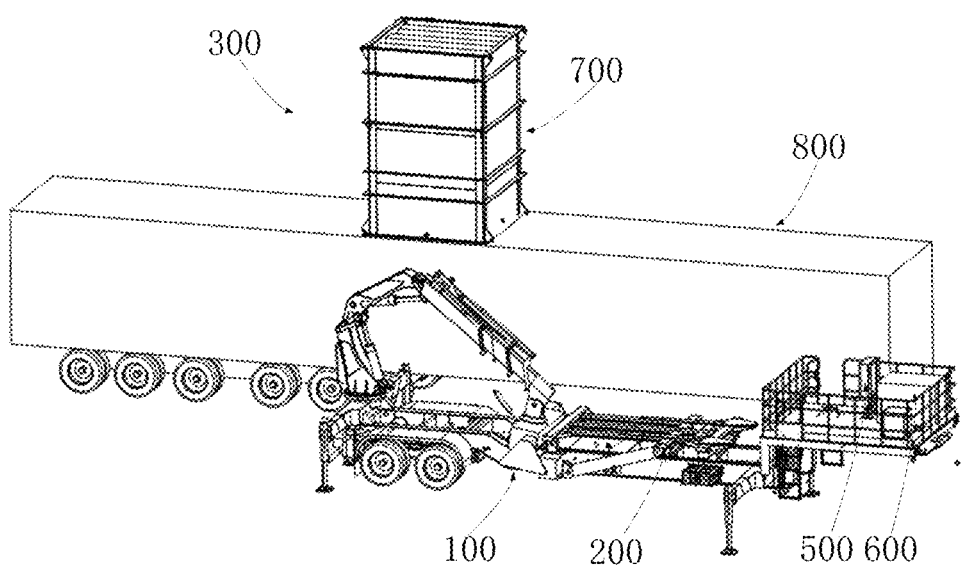
FIG. 14 is a schematic diagram of, in a transport vehicle disclosed in an embodiment of this application, a hanging device retracted to a transport state.

The installation process for the equipment body 700 in the embodiments of this application comprises:

as shown in FIG. 1, in an initial state, a frame 220 of a lifting device 200 is in a flat state, the equipment body 700 is placed on the frame 220; a plurality of support legs 120 are made to extend to level a chassis trailer 100; after the leveling is completed, a gripper 320 of a hanging device 300 is lifted to a maximum height to make a large enough space for the equipment body 700 to flip; as shown in FIG. 2, a first lifting cylinder 211 and a second lifting cylinder 212 of the lifting device 200 push the frame 220, and the equipment body 700 is driven to an erected state by the frame 220; as shown in FIG. 3, the gripper 320 of the hanging device 300 moves to the top of the equipment body 700 and grips the top of the equipment body 700; as shown in FIG. 4, a manipulator drives the equipment body 700 to detach from the frame 220 by the gripper 320; as shown in FIG. 5 and FIG. 6, the first lifting cylinder 211 and the second lifting cylinder 212 drive the frame 220 to return to the flat state; as shown in FIG. 7 and FIG. 8, the hanging device 300 transfers the equipment body 700 to the top of a power vehicle 800; a first laser emitting element 420 emits a laser marker to the top of the power vehicle 800, a first camera element 410 observes and photographs the position of the laser marker, and the result of photographing is sent to the control device 500, the control device 500 determines whether the equipment body 700 is located directly above a predetermined position; when it is located directly above, there is no need to adjust the position, and when it is not directly above, the hanging device 300 is controlled to adjust the position of the equipment body 700 so that the equipment body 700 is located directly above the predetermined position, as shown in FIG. 9 and FIG. 10; as shown in FIG. 11, when the position is determined, the gripper 320 of the hanging device 300 is controlled to loosen and release the equipment body 700 so that the equipment body 700 falls at the predetermined position; as shown in FIG. 12 to FIG. 14, the hanging device 300 is reset; the plurality of support legs 120 are retracted and the transport vehicle leaves the well site, thus completing the installation of the equipment body 700.

The disassembly process for the equipment body 700 in the embodiments of this application comprises:

the transport vehicle is moved to the designated position and placed parallel to the power vehicle 800; the distance between the transport vehicle and the power vehicle 800 in the left-right direction can be measured by the ranging element 430, and the distance is generally adjusted to the range of 2.3 meters to 3 meters; the second laser emitting element 450 emits a laser marker to the power vehicle 800, the position of the laser marker on the power vehicle 800 is observed and photographed by the second camera element 440, and the result of photographing is sent to the control device 500 to determine whether the position of the transport vehicle relative to the power vehicle 800 in the front-rear direction is suitable by the control device 500, and when it is not suitable, the position of the transport vehicle is adjusted to meet the actual requirements; the plurality of support legs 120 are made to extend to support the chassis trailer 100, and the chassis trailer 100 is detected by the inclination detecting element 470 whether the chassis trailer 100 meets the horizontal requirements, and when it is not met, the corresponding one or more support legs 120 is controlled to extend and retract to achieve leveling; the hanging device 300 extends and grips the equipment body 700 by the gripper 320; the equipment body 700 is hanged to the hanging area 112 of the chassis trailer 100; the frame 220 is driven to flip to the erected state by the first lifting cylinder 211 and the second lifting cylinder 212 of the lifting device 200 and the side of the equipment body 700 rests on the frame 220; the frame 220 is driven and gradually flattened by the first lifting cylinder 211 and the second lifting cylinder 212, so that the equipment body 700 is flattened on the frame 220; the plurality of support legs 120 are retracted and the transport vehicle leaves the well site, completing the disassembly of the equipment body 700.

In summary, in the embodiments of this application, the lifting device 200 and the hanging device 300 are integrated with the chassis trailer 100 respectively, so that no additional crane needs to be prepared; the equipment body 700 can be flipped and moved by the lifting device 200 to facilitate the hanging of the equipment body 700 by the hanging device 300; by means of the hanging device 300, the equipment body 700 can be hanged and transferred to a predetermined position, and in this process, there is no need to use a sling, and there is no need for personnel to work at height to install or remove the sling, and there is no need for personnel to direct the work at height, thus reducing the difficulty of operation, improving the convenience of operation, and avoiding personnel safety risks.

The above has described the embodiments of this application in conjunction with the drawings, but this application is not limited to the above specific embodiments, the above specific embodiments are merely schematic, not limiting, and many forms can be made by those of ordinary skill in the art under the inspiration of this application, without departing from the purpose of this application and the protection scope of the claims, all of which fall within the protection of this application.

The invention claimed is:

1. A transport vehicle, comprising: a chassis trailer, a lifting structure and a hanging structure;

wherein the chassis trailer has a carrying area and a hanging area;

the lifting structure comprises a lifting driver and a frame, the lifting driver connects the frame to the chassis trailer, the frame is flippably connected to the chassis trailer, one end of the frame is mounted to the chassis trailer via a rotating shaft, the frame has a first state and a second state relative to the chassis trailer, the frame in the first state is laid flat on a first carrying surface of the carrying area, the frame is configured to carry an equipment body, the frame in the second state is erected on the chassis trailer and causes the equipment body to be erected on a second carrying surface of the hanging area;

the hanging structure is provided at the chassis trailer to hang the equipment body from the hanging area and transfer it to a predetermined position;

a horizontal position of the first carrying surface is lower than a horizontal position of the second carrying surface, and the first carrying surface is connected with the second carrying surface by an inclined surface;

the hanging structure is a knuckle boom crane, the hanging structure comprises a mechanical arm and a gripper; and one end of the mechanical arm is rotatably connected to the chassis trailer, and the gripper is connected to the other end of the mechanical arm to grip or release the equipment body.

2. The transport vehicle according to claim 1, wherein the transport vehicle further comprises a first camera and a first laser emitter, the first laser emitter is configured to emit a laser marker, the first camera is configured to photograph the laser marker;

the first camera and the first laser emitter are both provided at the gripper and both electrically connected to a controller of the transport vehicle.

3. The transport vehicle according to claim 1, wherein the transport vehicle further comprises a hydraulic system, an oil circuit of the hydraulic system is connected to the mechanical arm and the gripper, respectively;

the oil circuit connected to the mechanical arm and/or the oil circuit connected to the gripper are/is provided with a pressure detector, the pressure detector is electrically connected to a controller of the transport vehicle.

4. The transport vehicle according to claim 1, wherein the lifting driver comprises a first lifting cylinder and a second lifting cylinder;

one end of the first lifting cylinder is movably connected to one side of the chassis trailer along a left-right direction, and the other end of the first lifting cylinder is movably connected to the frame;

one end of the second lifting cylinder is movably connected to the other side of the chassis trailer along the left-right direction, and the other end of the second lifting cylinder is movably connected to the frame;

wherein the left-right direction is perpendicular to a heading direction of the transport vehicle.

5. The transport vehicle according to claim 1, wherein the transport vehicle further comprises a ranging structure, the ranging structure is provided on the side of the chassis trailer and electrically connected to a controller of the transport vehicle to detect a distance between the chassis trailer and the predetermined position in a left-right direction, the left-right direction is perpendicular to a heading direction of the transport vehicle;

and/or, the transport vehicle further comprises a second camera and a second laser emitter, the second camera and the second laser emitter are both provided on the side of the chassis trailer and both electrically connected to the controller of the transport vehicle, the second laser emitter is configured to emit a laser marker, the second camera is configured to photograph the laser marker, the controller is configured to determine a position of the chassis trailer relative to the predetermined position in a front-rear direction according to the laser marker photographed by the second camera, the front-rear direction is parallel to the heading direction of the transport vehicle.

6. The transport vehicle according to claim 1, wherein the chassis trailer comprises a trailer body and a plurality of telescopic support legs, the plurality of support legs are provided at the edges of the trailer body respectively, and the plurality of support legs are connected to an oil circuit of a hydraulic system of the transport vehicle;

the transport vehicle further comprises a leveling structure, the leveling structure comprises an inclination detector provided in the trailer body, both the inclination detector and the hydraulic system are connected to a controller of the transport vehicle, the controller is configured to control at least part of the support legs to extend or retract accordingly by the hydraulic system to level the trailer body according to the inclination information of the trailer body detected by the inclination detector.

7. The transport vehicle according to claim 1, wherein the transport vehicle further comprises an enclosure, the enclosure is provided on the chassis trailer;

the enclosure encloses a holding space on the chassis trailer.

8. A method of using a transport vehicle, applied to the transport vehicle according to claim 1, comprising:

transporting the equipment body, carried in the carrying area, around a predetermined position by the chassis trailer;

lifting the equipment body by the lifting structure, to move the equipment body from the carrying area of the chassis trailer to the hanging area;

gripping and hanging the equipment body by the hanging structure, to transfer the equipment body from the hanging area to the predetermined position.

* * * * *